United States Patent [19]

Reid

[11] 4,028,290

[45] June 7, 1977

[54] HIGHLY ABSORBENT MODIFIED POLYSACCHARIDES

[75] Inventor: Albert R. Reid, Hockessin, Del.

[73] Assignee: Hercules Incorporated, Wilmington, Del.

[22] Filed: Oct. 23, 1975

[21] Appl. No.: 625,332

[52] U.S. Cl. ............... 260/17.4 GC; 260/17.4 CL; 260/17.4 ST
[51] Int. Cl.² ........................................... C08L 1/02
[58] Field of Search ... 260/17 A, 17.4 GC, 17.4 ST, 260/17.4 CL; 106/213

[56] References Cited

UNITED STATES PATENTS

| | | | |
|---|---|---|---|
| 2,922,768 | 1/1960 | Mino | 260/17.4 GC |
| 3,065,041 | 11/1962 | Suen | 260/17.4 GC |
| 3,125,406 | 3/1964 | Herman | 260/17.4 GC |
| 3,297,786 | 1/1967 | Horowitz | 260/17.4 GC |
| 3,455,853 | 7/1969 | Dekking | 260/17.4 GC |

*Primary Examiner*—Lorenzo B. Hayes
*Attorney, Agent, or Firm*—William S. Alexander

[57] ABSTRACT

Modified polysaccharides having greatly increased water-absorbing and binding capacity are prepared by reacting a polysaccharide such as cellulose or starch in the presence of acrylamide, another vinyl monomer and a divinyl crosslinking monomer using free radical polymerization techniques. The product is believed to be a complex mixture of crosslinked grafted polysaccharide and acrylamide copolymers.

8 Claims, No Drawings

HIGHLY ABSORBENT MODIFIED POLYSACCHARIDES

This invention relates to novel water-insoluble, highly absorbent products and to a method of preparing the same. More specifically, it relates to such products based on polysaccharide materials modified via graft polymerization.

In recent years a relatively high level of activity has taken place directed toward the preparation of material of improved absorbency as compared to materials heretofore known. This effort has been particularly vigorous with respect to cellullose and derivatives of cellulose, and a number of improvements have been accomplished. For example, cellulose itself, in the form of cotton staple, cotton linters or wood pulp, can be crosslinked via difunctional reagents such as epichlorohydrin to yield relatively small but useful absorbency increases. Dean et al., U.S. Pat. No. 3,589,364, teaches that normally water-soluble carboxymethyl cellulose can be crosslinked with epichlorohydrin to form highly absorbent materials. Elliott, in U.S. Pat. No. 2,639,239, and Chatterjee in U.S. Pat. No. 3,731,686 teach that the conventional water-soluble carboxymethyl cellulose in the Na salt form can be made substantially insoluble in water but highly absorbent by a simple heat treatment. It is also known that partial free acid carboxymethyl cellulose forms a more absorbent, substantially less soluble material upon being heated. In a very recent developement, Chatterjee et al., U.S. Pat. No. 3,889,678, teaches the preparation of absorbent materials via grafting onto a cellulosic backbone or host polymer, side chains of a copolymer of acrylonitrile and another nonionic vinyl monomer, followed by hydrolysis to convert the acrylonitrile moieties to amide and acrylic acid moieties.

In the preparation of polyacrylonitrile derivatives as taught by Chatterjee et al., considerable quantities of free homopolymer are formed. Since these patentees carry out the reaction in substantially aqueous medium, this homopolymer is readily separated and lost during subsequent work-up steps. Moreover, the hydrolysis step causes more losses of the homopolymer as well as damage to the grafted material.

In accordance with this invention, a method of preparing a grafted product is provided, which method is superior to the method proposed by Chatterjee et al. and which results in an improved product. Specifically, it has been found that if the grafting reaction is carried out in a substantially water-insoluble medium and in the presence of a water-soluble divinyl compound to effect crosslinking simultaneously with grafting, the amount of separable nongrafted homopolymer is greatly reduced, the hydrolysis step can be eliminated, and a novel product is prepared.

The method of the invention comprises reacting a water-wettable polysaccharide material simultaneously with acrylamide or methacrylamide and at least one water-soluble vinyl monomer and a water-soluble divinyl monomer in the presence of a free radical catalyst system, said reaction being carried out in a reaction medium comprising a substantially water-immiscible inert organic liquid having dispersed therein sufficient water to dissolve the vinyl monomers and wet the polysaccharide, and a minor amount of a water-miscible, low boiling organic liquid having a low chain transfer constant under the reaction conditions employed.

Two critical factors distinguish this invention over the prior art an lead to significantly better results than are accomplished by the prior art. These are (1) use of an inert liquid continuous phase and (2) simultaneously crosslinking and polymerizing the vinyl monomer. Use of the inert liquid as a continuous phase confines the water phase containing the catalyst components and the vinyl monomers in high concentrations to the water-wettable or water-soluble polysaccharide, thus promoting (a) more efficient conversion of monomer to polymer; (b) more efficient conversion of polysaccharides to radicals suited for grafting; (c) more efficient crosslinking of grafted polysaccharide molecules to synthetic polymer, more efficient crosslinking of grafted polysaccharide molecules to each other and of synthetic polymer molecules to each other; and (d) greater entanglement of crosslinked vinyl polymer molecules within the polysaccharide matrix so that the crosslinked vinyl polymer molecules are not easily separated therefrom.

Various water-wettable polysaccharide furnishes in fibrous or powder form can be employed in the process of this invention. For purposes of this discussion, a water-wettable polysaccharide is one which is either insoluble in water or capable of absorbing water and being swollen thereby. These include fibrous cotton and wood pulps, fine-cut cotton and wood pulps, activated polysaccharides such as oxidized cellulose and pre-irradiated celluloses and starches; hydrolyzed polysaccharides such as hydrocelluloses; various types of starch such as corn, potato, wheat starches, as is, or pre-gelatinized; guar gum; and various water-insoluble derivatives of cellulose, starch, and other polysaccharides such as carboxymethyl cellulose of D.S. 0.05 to 0.25 and hydroxy ethyl cellulose of M.S. 0.05 to 0.25; crosslinked carboxymethyl cellulose of D.S. 0.3 to 1.2 , and crosslinked hydroxyethyl cellulose of M.S. 0.3 to 3. Oxidized cellulose and regular cotton and wood pulps are preferred.

The presence of the inert water-immiscible diluent as a continuous phase makes a reaction mass of relatively low viscosity which is readily stirrable to improve heat transfer and to improve contact between the vinyl monomers and the polysaccharide. However, since the monomers and catalyst are preferentially soluble in water and the polysaccharide is preferentially wetted by the water, a high concentration of monomers, initiator and activator remains in the water phase and thus in contact with the polysaccharide. This high concentration of the monomers and activators, confined to the vicinity of the polysaccharide, is believed to be responsible for the high conversion of monomer to crosslinked grafts and for the low incidence of separable synthetic (non-polysaccharide) polymer. In the absence of the inert water-immiscible diluent reaction medium, i.e., if water or water plus water-miscible diluent is used as the total reaction medium, the concentration of monomer in the vicinity of each polysaccharide particle is less and products with substantially lower absorption capacity result and the yields thereof are substantially lower.

Substantially any inert, water-immiscible organic liquid can be employed as the reaction medium. By inert is meant that the medium is a nonsolvent for the polysaccharide and the other reactants; it is essentially nonreactive with the polysaccharide and other reactants under the conditions existing during the polymerization and grafting reaction; and it has a low chain transfer constant under the conditions existing during the said reaction. The amount of the diluent is not critical so long as there is sufficient diluent to assure good stirrability and good heat transfer, normally about 4 to 8 parts per part of reactants (monomers plus polysaccharide). The preferred class of such materials is the aromatic hydrocarbons, especially toluene. It is found that the best yields and the most highly absorbent products can be prepared when the reaction is carried out in toluene.

As suggested by the above, it is desirable to keep the amount of the water relatively low with respect to the reactants so that a relatively high vinyl monomer concentration will be maintained in the vicinity of the polysaccharide particles. To this end only enough water is used to dissolve the monomers and uniformly wet the polysacccharide, about 1.5 to 2.5 parts per part of reactants.

The vinyl monomers suitable as the second monomer for use in this invention are the water-soluble monoolefinic type containing hydrophilic groups and which, in the absence of the host polysaccharide, polymerize to form water-soluble homopolymers or copolymers with acrylamide or methacrylamide. Such monomers are substantially insoluble in the preferred hydrocarbon reaction medium. Examples of such monomers include acrylic and methacrylic acid and alkali metal salts thereof, alkali metal salts of 2-acrylamido-2-methylpropane sulfonic acid, alkali metal salts of sulfopropylacrylic acid, 1,2-dimethyl-5-vinylpyridinium methyl sulfate, and 2-(methacroyloxy)-ethyltrimethylammonium methyl sulfate. Preferred vinyl compounds are acrylic acid and the alkali metal salts thereof. The absorption capacity of the grafted, crosslinked polysaccharide-synthetic polymer per unit weight is greater with lower molecular weight vinyl monomers.

The polysaccharide-synthetic polymer grafted product is crosslinked with a divinyl compound which is readily polymerizable via the same free radical mechanisms and catalyst system employed to polymerize the monomers specified above. The crosslinker must also be water-soluble and essentially insoluble in the inert reaction diluent. The preferred crosslinker is methylene-bis-acrylamide (MBA). Other divinyl monomers which can be used as cross-linkers are methylene-bis-methacrylamide and quaternary compounds such as, e.g., quaternized 2,5-divinyl pyridine.

The catalyst systems employed in preparing the graft copolymers of this invention are known catalyst materials comprising an inorganic oxidizing agent as an initiator and an inorganic reducing agent as an activator. Any such combination which is water-soluble, which is essentially insoluble in the inert reaction diluent, and which is an efficient generator of free radicals in aqueous systems can be employed. Preferred oxidizing agent initiators in such combinations are persulfates such as potassium, sodium or ammonium persulfate, and peroxides such as $H_2O_2$ and alkali metal bromates and chlorates. Preferred reducing agent activators are bisulfites, such as potassium, sodium or ammonium bisulfite; bisulfite; sulfites such as potassium, sodium or ammonium sulfite; and ferrous iron in the form of such salts as ferrous ammonium sulfate and alkali metal thiosulfates. The preferred redox combination is potassium persulfate and sodium bisulfite. Sufficient catalyst is added to achieve a suitable rate of polymerization and a high monomer conversion leading to a high yield of high molecular weight crosslinked grafted polysaccharide-synthetic polymer product in a normal reaction period of 2 to 4 hours. A concentration of initiator equal to about 0.2 to 0.4% and of activator equal to about 0.4 to 0.8%, both based on the weight of the vinyl monomers, is usually sufficient to give the appropriate rate of reaction.

If desired, the reaction can be carried out without the reducing agent present. However, the lack of reducing agent (activator) must be offset by using higher reaction temperatures, higher concentration of oxidizing agent, and longer reaction times. For this reason, the combination catalyst is preferred.

It is also possible to initiate the free radical polymerization by means of high energy irradiation using, e.g., gamma rays from a cobalt 60 or cesium 137 source or electron beams from a linear accelerator.

As stated hereinabove, it is preferred to have present in the reaction system a low boiling, water-miscible organic diluent which has a low chain transfer constant. This material acts as a precipitant for the water-soluble polymer formed during the reaction and as a heat transfer fluid to enable reflux operation at a lower temperature than would be possible with water alone to dissipate the heat of reaction. It has also been found, however, that the presence of an appropriate low boiling liquid, in an amount equal to about 25 to 65% and preferably about 30 to 55% of the volume of the inert diluent, leads to higher yields and higher quality products than does water alone. Examples of such liquids which are water-miscible and can be employed in the practice of this invention are acetone and isopropanol. The preferred liquid is acetone.

The product which results from carrying out the process of this invention is different in several respects from any product heretofore known to the art. First, the product is highly cross-linked whereas crosslinkers are not used in the preparation of the products of the prior art. More importantly, however, it is a complex mixture of grafted polysaccharide and free vinyl homopolymer and/or copolymer containing crosslinkages randomly distributed between grafted polymer side chains, between free homopolymer or copolymer and between grafted polymer side chains and free polymer chains. All or substantially all of the polymer, including the free polymer, is associated in some manner with the polysaccharide and is substantially inseparable therefrom.

The preferred products of the invention contain from about 10 to 60% by weight of the host polysaccharide and about 40 to 90% by weight of total grafted and free synthetic polymer. The acrylamide component will usually make up about 10 to 50% of the synthetic polymer. Preferably, the host polysaccharide will be about 40 to 50% of the composition with the synthetic polymer being about 50 to 60%. Preferably, the synthetic polymer portion will contain about 20 to 30% of the acrylamide component. Further, the preferred products contain about 0.2 to 10%, and preferably about 0.5 to 2%, based on the combined weight of monomers, of the divinyl crosslinking compound.

The absorbent products of the invention can be used in a variety of applications where absorbency is a desideratum. In particular, they are useful in applications such as feminine hygiene products, dental sponges and disposable diapers. Other applications are as moisture barriers, e.g., for underground cables and foundations of buildings, for erosion control, and as soil conditioners. An aqueous slurry of the product from chemical cotton or wood pulp furnish can be cast into a film which, on drying, resembles porous paper which can absorb and bind large quantities of water.

The absorbent products can be used alone in any of the above applications. However, for economic reasons, they can be blended with conventional absorbent cellulosics such as crosslinked carboxymethyl cellulose, chemical cotton, wood pulp or cotton staple. Relatively small amounts of the invention product can effect relatively large increases in absorbency over that of the cellulosic absorbents alone.

Another technique for making use of blends of the invention products and more conventional cellulosics is to coat the conventional cellulosics with the invention products. In this method, a grafted, water-insoluble product is slurried in water or aqueous acetone or isopropanol with the conventional cellulosic, followed by treatment with a nonsolvent to deposit the grafted product on the surface of the cellulosic in a thin layer. The product in then dehydrated using a water-miscible nonsolvent.

In the examples which follow, the absorbent character of the products is expressed as an estimate of their water-binding capacity and as a measure of their relative rate of absorbing water and salt solutions. To determine water absorbing capacity, 1 gram (dry basis) of each product was added rapidly with stirring to 100 and 200 ml. of water in an appropriate bottle. The bottles were capped and then checked at intervals until it appeared no further absorption was possible. Results are expressed in terms of the gel characteristics of the resultant solution. To determine the relative rate of absorption, 50 and 25 ml. of water and 25 and 20 ml. of 1% NaCl were added to 1 gram (dry basis) of each sample in an appropriate bottle. A timer was started as soon as the liquid contacted the sample and the time required to effect gelling was recorded. This test will be hereafter referred to as the "flood test".

Some of the products were tested for absorbent capacity by means of the so-called "CAP" (capillary or wicking action) test. The apparatus employed for the CAP test consists of a Buchner fritted glass funnel, with a rubber tube attached to its neck; the tube is attached at the other end to a 50 ml. burette. The burette is filled with the test solution, and the level of liquid is allowed to rise until it just makes contact with the bottom of the frit in the funnel. The level of liquid in the burette can be anywhere from 0 to 60 cm. below the bottom of this frit. The test sample is placed on top of the frit and a weight exerting a pressure of from 0.1 to 0.4 p.s.i. is applied over the entire surface of the sample. The test is then begun, and the loss of fluid in the burette is monitored as a function of time to give the rate of absorption. When equilibrium is reached, the capacity is calculated by dividing the total fluid absorbed at equilibrium, or at the end of 45 minutes, by the weight of the polymer sample. The conditions used with the CAP test for this work were:

1. Pressure exerted on the sample was 0.11 p.s.i.
2. All of the tests were done with the liquid in the burette 2 cm. below the fritted glass initially. This level was allowed to continually change as absorption occurred.
3. Pore size of the frit was about 4–5.5 microns.

A complete tabulation of absorbency capacities and rates is presented in Tables 1 and 2 following the Examples.

In determining the vinyl polymer content reported in the examples, it was assumed that all of the polysaccharide raw material was recovered and the following calculation was made:

$$\text{Vinyl Polymer} = 100 - \frac{(\text{Grams polysaccharide} \times 100)}{(\text{Grams polysaccharide} + \text{grams vinyl monomer}) \frac{\% \text{ yield}}{100}}$$

EXAMPLE 1-A

To a 1.5 liter jacketed resin flask equipped with a tap water cooled reflux condenser, pressure-equalizing addition funnels, and a constant rate, high-torque stirrng assembly was added 32.4 grams (0.2 mole) of acetone-wet hypochlorite-oxidized cellulose having a theoretical oxygen level of one atom per anhydroglucose unit, 400 ml. of toluene and sufficient acetone to bring the total volume up to 200 ml. of acetone. The slurry of oxidized cellulose in a 2/1 by volume mixture of toluene and acetone was stirred for 10 minutes at 25° C. At the same time an aqueous monomer solution was prepared as follows: To 110 ml. of water containing 0.06 g. (0.00022 mole) of potassium persulfate in the dissolved state was added 15 g. (0.21 mole) of acrylamide and 0.25 g. (0.0016 mole) of N,N'-methylenebisacrylamide (MBA). After the acrylamide and MBA had dissolved, 26.9 g. (0.374 mole) of acrylic acid (equivalent to 35 g. of sodium acrylate after neutralization to pH 8.5) was added while cooling the solution in an ice bath. The solution was adjusted to pH 7.5 by slow addition of 50% NaOH solution with stirring. The aqueous monomer solution was transferred to a pressure-equalizing addition funnel. The beaker was rinsed with 42 ml. of water and the washings added to the addition funnel. The contents of the funnel were agitated sufficiently to mix the washings uniformly throughout the monomer solution.

The aqueous monomer solution was added to the oxidized cellulose slurry in the resin flask dropwise with stirring over about 15 minutes, the addition funnel was removed, and stirring was continued for 1 hour at 25° C. to allow a uniform impregnation of the oxidized cellulose by the aqueous monomer solution. During this time pressure-equalizing addition funnels containing 0.6% aqueous potassium persulfate solution and 2.3% aqueous sodium bisulfate solution were connected to the resin flask. After the one hour pretreatment at 25° C., the system was heated to 50° C. (Prior to heat-up, brine solution replaced tap water as the coolant for the reflux condenser.) After stirring for 15 minutes at 50° C., the slurry was alternately sparged with nitrogen and evaluated to reflux through 10 cycles to remove air. With the system under reflux at 50° C., 10 ml. of each of the $NaHSO_3$ and $K_2S_2O_8$ solutions were added over 90 minutes, adding 1-millimeter aliquots every 10 minutes. Each $NaHSO_3$ aliquot was followed 1 minute later by a $K_2S_2O_8$ aliquot. At a reaction time of 100 minutes another 10 ml. of $NaHSO_3$ solution was added in increments of 2 ml. every 10 minutes to remote residual persulfate from the system and avoid subsequent contamination of the cellulose-synthetic polymer product with a strong oxidant.

Cooling of the reactor contents was started after a reaction time of 120 minutes, and the system was placed under a slightly positive nitrogen pressure. After 140 minutes when all of the second lot of $NaHSO_3$ solution had been added, the temperature of the reactor was quickly lowered to 25° C. Excess liquid was removed via a filter stick, and the product was transferred to a beaker and washed once with ~1200 ml. of 80 weight percent aqueous methanol. In the second wash the slurry was adjusted to pH 8.5 with sodium carbonate solution. The product was then washed sulfate-free with 80 weight per cent aqueous methanol. Following excess water removal by steeping three times in 95 weight percent aqueous methanol, excess liquid was removed by vacuum filtration, and the product was dried in vacuo at 60° C. Yield on a dry basis was quantitative based on total starting weight of reactants. The concentration of vinyl polymer in the product accordingly was about 61%.

The product in pellet form was ground in a Wiley Micro-mill to different particle sizes. Analysis of the ground material showed a nitrogen content of 3.7%, indicating 28:72 weight percent acrylamide to sodium acrylate ratio in the grafts and synthetic polymer part of the product. This compares to 30 weight percent acrylamide content of the neutralized monomer blend of acrylamide and sodium acrylate.

Flood test results were obtained on portions of the product ground through 20, 40 and 60 mesh, and comparisons made with (1) an analogous crosslinked free (i.e., not grafted to polysaccharide) acrylamide-sodium acrylate copolymer prepared from a similar 30:70 weight percent acrylamide-sodium acrylate monomer blend and an MBA content of 0.5%, based on weight of monomers, and with (2) finely ground (~75% through 60 mesh) epichlorohydrin crosslinked carboxymethyl cellulose prepared essentially as described in U.S. Pat. No. 3,589,364, using fine-cut chemical cotton. Tests at higher liquid to sample ratios of 100/1 and 200/1 were done to determine the approximate absorption capacity of the samples for water. Rates of absorption of water as manifested by gelling time were determined from flood tests employing liquid/sample ratios of 50/1 and 25/1, while rates of absorption of 1% NaCl solution were obtained at liquid/sample weight ratios of 25/1 and 20/1. The results shown in Table 1 indicate that the product of this example has a water absorption capacity equal to that of the crosslinked copolymer and much higher than that of the crosslinked CMC. Both this example and the copolymer can bind or gel 100 parts of water per part of sample, and almost gel 200 parts of water per part of sample. In contrast, the crosslinked CMC gives low viscosity gel slurries at a water to sample ratio of 100/1 indicating an absorption capacity of much less than 100 ml. of water per gram of sample and probably closer to 40 to 50 ml. of water per gram of sample. At the lower liquid/sample ratios the gelling times are lower for the invention product and the crosslinked CMC than for the crosslinked copolymer when compared at about the same particle size in water and 1% NaCl solution, indicating that the invention product and the crosslinked CMC absorb and bind water and 1% NaCl solution faster than the copolymer.

The water absorption capacity of crosslinked CMC is greatly increased by mixing with the product of this Example 1-A to make a 50:50 weight percent blend as shown in Table 1. At water/sample ratios of 50/1, 100 and 200/1, the water-binding power of the blend is much greater than that of XLCMC, but lower than that of the invention by itself. Similarly, the water absorption capacity of fine-cut chemical cotton is increased greatly by mixing with the invention product to make a 50:50 weight percent blend. However, the rate of binding of 1% NaCl solution by the blend is much inferior to that of the invention product.

A 0.5% aqueous slurry of the product of this Example 1-A was cast into a film which on drying resembled a flexible sheet of porous paper. The paper had a high water absorption capacity, similar to that of the product in powder form.

EXAMPLES 1-B, 1-C AND 1-D

The procedure of Example 1-A was repeated in triplicate except that the dried products were ground in a Wiley Intermediate-Mill through 20 mesh. As shown in Table 1, all three Examples 1-B, 1-C and 1-D absorbed water at liquid/solid ratios of 50/1 and 25/1 and 1% NaCl solution at liquid/solid ratios of 25/1 and 20/1 faster than did the crosslinked acrylamide-sodium acrylate copolymer. The water absorption capacity of these products was similar to that of Example 1-A and the crosslinked copolymer.

| Yield | Vinyl Polymer Content | Cellulose Content |
|---|---|---|
| 1-B – 100% | 61% | 39% |
| 1-C – 97% | 59% | 41% |
| 1-D – 93% | 58% | 42% |

EXAMPLE 2

The procedure of Example 1-B was repeated except that the MBA content was 0.25% instead of 0.50% based on the weight of monomers. As shown in Table 1, this product was not as good as that of Example 1-A, 1-B, 1-C or 1-D having a lower rate of absorption (or longer time to gel) at 25/1 in 1% NaCl solution, and a lower water absorption capacity. Yield = 93%; vinyl polymer content = 58%.

EXAMPLE 3

The procedure of Example 1-B was repeated except that the MBA content was 0.38% instead of 0.50% based on the weight of monomers. This product compared favorably with Example 1-A, 1-B, 1-C and 1-D and the crosslinked acrylamide-sodium acrylate copolymer in absorption capacity for water. It gelled faster than the crosslinked copolymer in water at liquid/sample ratios of 50/1 and 25/1 and in 1% NaCl solution at liquid/sample ratios of 25/1 and 20/1, the rate of absorption of liquid by this product being similar to that of the product of Example 1-A. Yield = 93%; vinyl polymer content = 58%.

EXAMPLE 4

The procedure of Example 1-B was repeated except that the MBA content was 0.75% based on the weight of monomers. This product was similar to Example 1-B in water absorption capacity. However, it was much inferior to Example 1-B and the crosslinked copolymer in rate of absorption of 1% NaCl solution, the gelling times at liquid to sample ratios of 25/1 and 20/1 being very much higher, as shown in Table 1. Yeild = 100%; vinyl polymer content = 61%.

EXAMPLE 5

The procedure of Example 1-A was repeated except that the MBA was omitted. The product did not have superabsorbent properties. A 1% aqueous slurry of this sample had a low Brookfield viscosity of 55 cps. (No. 2 spindle, 40 r.p.m.) with some material settling out rapidly. The product appeared to be a mixture of products; fine-cut cellulose and grafted pulp which did not swell very much in water and settled out, and a water-soluble low viscosity acrylamide-sodium acrylate copolymer. Aqueous slurries did not form gels even at lower liquid to sample ratios of 50/1 and 25/1 in water and 25/1 and 20/1 in 1% NaCl solution. Yield = 88%; vinyl polymer content = 55%.

EXAMPLE 6

The procedure of Example 1-A was repeated except the toluene was omitted. The toluene was replaced with an equal weight of acetone and water to maintain a similar solids (cellulose + monomers) content in the system for comparable stirrability (i.e., 10.5% solids based on the weight of the system). The yield of product was low (48%) with only ~16% conversion of monomers to polymer. The product did not have superabsorbent properties, being similar to that of Example 5 when dispersed in water or 1% NaCl solution.

EXAMPLE 7

The procedure of Example 1-A was repeated except that the volume ratio of toluene to acetone was changed from 2/1 to 5/1 by replacing 100 ml. of acetone with 100 ml. of toluene. The yield of product was low (63.5%) with only about 40% conversion of monomers to polymer. As shown in Table 1, this product was inferior to that of Example 1-A, the portion ground through 20 mesh having a lower water-binding capacity at a liquid to sample ratio of 200/1, a longer time to gel at 50/1, and no gelling up to 10 minutes at 20/1 in 1% NaCl solution.

EXAMPLE 8

The procedure of Example 1-A was repeated except that the volume ratio of toluene to acetone was changed from 2/1 to 1/1 by replacing 100 ml. of toluene with 100 ml. of acetone. This product was inferior to that of Example 1-A having a lower water-absorption capacity than that of Example 1-A and was similar to the product of Example 7 when dispersed in 1% NaCl solution. Yield = 100%; vinyl polymer content = 61%.

EXAMPLE 9

The procedure of Example 1-B was repeated except that (1) the activator, NaHSO$_3$, was omitted for the polymerization stage, and (2) the reaction time at 50° C. was increased by 1 hour. NaHSO$_3$ was added after the end of the reaction period to consume residual persulfate. The product compared favorably with the group of Example 1-B, 1-C and 1-D in water absorption capacity but was not as good as Example 1-B in rate of absorption of water at liquid/sample ratios of 50/1 and 25/1 or rate of absorption of 1% NaCl solution at 25/1 and 20/1. However, at 20/1 in 1% NaCl it is comparable to Examples 1-A, 1-C and 1-D, but inferior to all of them at a liquid to sample ratio of 25/1 in a 1% NaCl solution. Yield = 86%; vinyl polymer content = 54%.

EXAMPLE 10

The procedure of Example 1-A was repeated except that a 70:30 weight percent acrylamide-sodium acrylate monomer blend was employed, and the reaction temperature was 60° C. instead of 50° C. This product was inferior to that of Example 1-A in water absorption capacity and in rate of absorption in water and 1% NaCl solution. Yield = 100%; vinyl polymer content = 61%.

EXAMPLE 11

The procedure of Example 1-A was repeated except that unoxidized fine-cut chemical cotton furnish was employed. This product compared favorably with that of Example 1-A with regard to water absorption capacity and rate of absorption in water and 1% NaCl solution. Yield = 80%; vinyl polymer content = 51%.

EXAMPLE 12

The procedure of Example 11 was repeated except that the temperature during the 1-hour pretreatment period (i.e., time between addition of the aqueous monomer solution and air removal by alternately nitrogen sparging and evacuating to reflux) was increased from 25° C. to 50° C. This product compared favorably with that of Example 1-A in water absorption capacity and rate of binding of water and 1% NaCl solution. Yield of product was 76.5%; vinyl polymer content was 49%.

Although giving good performance in flood tests, this product gave poor results in the CAP test. In this test the initial wetting of the product of Example 12 with salt solution resulted in fast hydration and gel formation at the liquid-solid interface which drastically reduced further absorption of liquid by the unwetted product.

In a Waring Blendor jar containing 400 ml. of water was dispersed 8 grams of fibrous chemical cotton. To this was added 2 grams of the product of this Example 12. The mixture was agitated vigorously for 5 minutes, left unstirred for 10 minutes, stirred another minute, whereupon the slurry was transferred to a beaker and 800 ml. of acetone was added with stirring. Agitation was continued for an additional 10 minutes. Excess liquid was decanted and the solid residue was steeped 3 times in 600 ml. of acetone, then excess acetone was removed and the solids were dried in vacuo at 60° C. for about 90 minutes.

The CAP test results for this material were significantly better than those for the Example 12 material alone as shown in Table 2. This demonstrates that advantage can be taken of the high absorbent capacity of the material by spreading it thinly as a coating over the surface of a fiber. Formation of a continuous concentrated gel network at the water-liquid solid interface is avoided upon wetting, while the good wicking action of the fibrous furnish is substantially retained.

EXAMPLE 13

The procedure of Example 12 was repeated except the quantity of MBA was increased from 0.5% to 2.0% based on weight of monomers. This more highly cross-linked product was much inferior to that of Example 12 in water absorption capacity giving a low viscosity gel slurry at a water/sample ratio of 200/1 whereas the product of Example 12 was almost gelled at this ratio. The product compared favorably with that of Example 12 at water/sample ratios of 100/1, 50/1, and 25/1, but was very much inferior with regard to rate of binding of 1% NaCl solution. As shown in Table 1, this product did not gel 1% NaCl solution even in 10 minutes. This lack of gelling of 1% NaCl solution (i.e., reduced rate of hydration in this system) is reflected in greatly improved CAP test results compared to the product of Example 12, as shown in Table 2. The reduced rate of hydration is most likely a result of the greater degree of crosslinking in this sample compared to that of the Example 12 product. Yield = 94%; vinyl polymer content = 58%.

EXAMPLE 14

The procedure of Example 12 was repeated except that the quantity of MBA was increased from 0.5 to 10% based on weight of monomers. Yield = 82%; vinyl polymer content = 52%.

As shown in Table 1, this highly crosslinked product performed poorly in flood tests, exhibiting a much lower water absorption capacity and rate of absorption of water and 1% NaCl solution than Example 12. This product gave low viscosity gelslurries in water at liquid/sample ratios of 200/1, 100/1 and 50/1, and in 1% NaCl solution at liquid/sample ratios of 25/1 and 20/1. No gelling was observed in 10 minutes even at a low water/sample ratio of 25/1. However, the much lower rate of hydration of this product in 1% NaCl solution led to much better CAP test results than observed with the product of Example 12 as shown in Table 2.

EXAMPLE 15

The procedure of Example 12 was repeated except that MBA was omitted. Yield = 91%; vinyl polymer content = 57%. This product did not have superabsorbent properties, being similar to that of Example 5.

EXAMPLE 16

The procedure of Example 12 was repeated except that the acrylamide was replaced with an equimolar quantity of sodium acrylate in the aqueous monomer solution. The yield of product was low (49%) with only about 16 % of the monomers converted to polymer. As shown in Table 1, this product was much poorer in water absorption capacity than that of Example 12, although comparable in rate of gelling at a water/sample ratio of 25/1. It was inferior to the product of Example 12 in rate of binding of 1% NaCl solution at a liquid/sample ratio of 20/1, no gelling being observed up to 12 minutes after contact of the product with the salt solution.

EXAMPLE 17

The procedure of Example 12 was repeated except that the toluene was replaced with an equal volume of benzene. This product was similar to that of Example 12 in water absorption capacity and rate of gelling of water and 1% NaCl solution. Yield = 69%; vinyl polymer content = 43%.

EXAMPLE 18

The procedure of Example 12 was repeated except that the fine-cut chemical cotton was replaced with long-fiber staple cotton. The use of the long-fiber furnish required an increase from 400 ml. to 600 ml. of toluene and from 200 ml. to 300 ml. of acetone to achieve adequate stirring and keep the toluene/acetone ratio at 2/1 as with Example 12. Also, all of the potassium persulfate required for the polymerization was added to the aqueous monomer solution prior to dropwise addition to the cotton in toluene-acetone slurry. No activator was added during polymerization. However, some $NaHSO_3$ was added after reaction, as usual, to remove residual persulfate. Yield = 74%; vinyl polymer content = 47%. The knotted fiber product was hammer-milled in order to break apart matted fiber clusters with a minimum of fiber cutting.

This fibrous sample was comparable to that of Example 12 in water absorption capacity and rate of gelling in water. However, at a liquid/sample ratio of 25/1 this product gelled 1% NaCl solution faster than any other sample tested, and at a ratio of 20/1 was comparable to the product of Example 1-B. As shown in Table 2, this product gave a much better performance in the CAP test than that of Example 12, most likely because of its fibrous nature.

EXAMPLE 19

The procedure of Example 12 was repeated except that the fine-cut chemical cotton furnish was replaced by a gelatinized wheat starch. As shown in Table 1, this product is comparable to that of Example 12 in water absorption capacity, but is inferior to that of Example 12 in the rate of binding or gelling of water at liquid/sample ratios of 50/1 and 25/1 and of 1% NaCl solution at ratios of 25/1 and 20/1. Yield = 82%; vinyl polymer content = 52%.

EXAMPLE 20

The procedure of Example 12 was repeated except that the fine-cut chemical cotton was replaced by a corn starch furnish. Yield = 83%; vinyl polymer content = 53%.

This product compared favorably with that of Example 12 in water absorption capacity and rate of gelling of water, but was inferior in rate of binding 1% NaCl solution.

EXAMPLE 21

The procedure of Example 12 was repeated except that the fine-cut chemical cotton was replaced by guar gum. Yield = 81%; vinyl polymer content = 51%.

This product had a lower water-binding capacity at a liquid/sample ratio of 200/1, and a slower rate of absorption of water than that of Example 12. This product compared favorably with that of Example 12 in rate of gelling of 1% NaCl solution at a liquid to sample ratio of 20/1.

TABLE 1

| | Flood Test Data on Crosslinked Cellulose-Synthetic Polymer Products[a] | | | | | |
|---|---|---|---|---|---|---|
| | Absorption of Water at Liquid to Sample Ratios | | | | Absorption of 1% NaCl Solution at Liquid to Sample Ratios | |
| Example No. | 200/1 | 100/1 | 50/1 | 25/1 | 25/1 | 20/1 |
| 1A | AG | G | G 15—20 sec. | G 10 sec. | — | G 15–20 sec. |
| 1B | AG | G | G 8 sec. | G 3 sec. | G 20 sec. | G 5 sec. |
| 1C | AG | G | G 8 sec. | G < 5 sec. | G 35 sec. | G 20 sec. |
| 1D | AG | G | G 20 sec. | G < 5 sec. | G 55 sec. | G 20–25 sec. |
| XL Copolymer[b] | AG | G | G 40 sec. | G 20 sec. | G 65 sec. | G 40 sec. |
| XL CMC[c] | — | LVGS | HVGS | G 10 sec. | G 20–25 sec. | G 5 sec. |
| Blend[d] | MVGS | G | G 55 sec. | G 20 sec. | NG 480 | G 360 sec. |
| Blend[e] | HVGS | G | 50–60 sec. | G 7 sec. | — | G 20 sec. |

TABLE 1-continued

Flood Test Data on Crosslinked Cellulose-Synthetic Polymer Products[a]

| Example No. | Absorption of Water at Liquid to Sample Ratios | | | | Absorption of 1% NaCl Solution at Liquid to Sample Ratios | |
|---|---|---|---|---|---|---|
| | 200/1 | 100/1 | 50/1 | 25/1 | 25/1 | 20/1 |
| 2 | MVGS | HVGS | G 20 sec. | G 5 sec. | G 70 sec. | G 25 sec. |
| 3 | HVGS | G | G 15 sec. | G 10 sec. | G 30 sec. | G 20–25 sec. |
| 4 | AG | G | G 35 sec. | G 10 sec. | NG 240 | G 90 sec. |
| 5 | — | LVGS (Separation) | — | — | — | — |
| 6 | — | LVGS (Separation) | LVGS 600 sec. | LVGS 300 sec. | LVGS 300 sec. | LVGS 300 sec. |
| 7 | MVGS | G | G 70 sec. | G 10 sec. | LVGS 240 sec. | HVGS 240 sec.; NG 600 sec. |
| 8 | HVGS | HVGS | HVGS 10 sec.; NG 180 sec. | HVGS 10 sec.; NG 60 sec. | MVGS 240 sec. | HVGS 90 sec.; NG 600 sec. |
| 9 | AG | G | G15–20 sec. | G 8 sec. | G 90 sec. | G 20 sec. |
| 10 | — | HVGS | NG 600 sec. | G 60 sec. | LVGS 240 sec. | LVGS 240 sec. |
| 11 | AG | G | G 7 sec. | G 3 sec. | G 25 sec. | G 15–20 sec. |
| 12 | AG | G | G 8 sec. | G < 5 sec. | G 55 sec. | G 25 sec. |
| 13 | LVGS | G | G 10–15 sec. | G 5 sec. | NG 900 sec. | NG 900 sec. |
| 14 | LVGS | LVGS | LVGS | NG 600 sec. | NG 600 sec. | NG 600 sec. |
| 15 | — | LVGS (Separation) | — | — | — | — |
| 16 | LVGS | LVGS to MVGS | NG 60 sec. | G 3 sec. | — | NG 720 sec. |
| 17 | AG | G | — | G < 5 sec. | — | G 25 sec. |
| 18 | AG | G | G 10 sec. | G 3 sec. | G 5 sec. | G 3 sec. |
| 19 | AG | G | G 35 sec. | G 15 sec. | G 90 sec. | G 80 sec. |
| 20 | AG | G | G 11 sec. | G 5 sec. | G 120 sec. | G 70 sec. |
| 21 | LVGS to MVGS | G | G 20 sec. | G 8–10 sec. | G 75 sec. | G 25 sec. |
| 22 | AG | G | G 20–25 sec. | G 5 sec. | G 120 sec. | G 30 sec. |

Footnotes
[a]AG = almost gelled; G = gelled; LVGS, MVGS, HVGS = low, medium and high viscosity gel slurries, respectively; NG = not gelled; all samples through 20 mesh unless otherwise specified.
[b]Acrylamide-sodium acrylate (30:70 wt. %) copolymer crosslinked with 0.5% MBA based on monomer weight.
[c]Epichlorohydrin crosslinked carboxymethyl cellulose (XL CMC) having 0.7 D.S. (~75% through 60 mesh)
[d]50:50 wt. % blend of Example 1-A and fine-cut chemical cotton.
[e]50:50 wt. % blend of Example 1-A and XL CMC.

TABLE 2

CAP Test Data on Crosslinked Cellulose-Synthetic Polymer Products

| Sample | Absorption Per Time Interval* | | | | | | | | | |
|---|---|---|---|---|---|---|---|---|---|---|
| | 1 | 3 | 5 | 10 | 15 | 20 | 25 | 30 | 35 | 40 | 45 |
| Example 12 | 0.4 | 0.6 | 0.7 | 1.0 | 1.1 | 1.3 | 1.4 | 1.5 | 1.6 | 1.7 | 1.8 |
| Fibrous Chemical Cotton (FCC) | 0.8 | 1.9 | 2.8 | 3.7 | 4.3 | 4.5 | 4.5 | 4.5 | — | — | — |
| FCC coated with 25% of Example 12 by weight | 0.9 | 2.3 | 3.5 | 5.4 | 6.1 | 6.4 | 6.5 | 6.5 | 6.5 | — | — |
| Example 13 | 1.1 | 1.9 | 2.5 | 3.7 | 4.6 | 5.4 | 6.1 | 6.6 | 7.0 | 7.5 | 7.7 |
| Example 14 | 2.0 | 4.0 | 5.2 | 6.4 | 6.5 | 6.5 | 6.5 | — | — | — | — |
| Staple Cotton | 0.4 | 0.6 | 0.8 | 1.1 | 1.4 | 1.6 | 1.8 | 2.0 | 2.1 | 2.2 | 2.3 |
| Example 18 | 1.0 | 2.3 | 3.4 | 5.7 | 7.5 | 8.2 | 8.6 | 8.8 | 8.9 | 9.0 | 9.0 |

*Absorption of 1% NaCl solution (ml./g. of sample) at various times in minutes

EXAMPLE 22

Using the procedure substantially as described in Example 1-A, a fibrous chemical cotton was reacted in 570 ml. of toluene and 200 ml. of acetone with a 50/50 by weight mixture of acrylamide and sodium acrylate. The catalyst additions comprised 0.1 g. aliquots of potassium persulfate and 0.4 g. aliquots of activator. The yield of product was quantitative; vinyl polymer content — 61%.

The product of this reaction was ground in a Wiley intermediate mill to 20 mesh particle size. Analysis of the ground material showed a nitrogen content of 6.35% indicating that the acrylamide to sodium acrylate ratio in the product was 45:55. The product compared favorably with Example 1-B in the water absorption capacity and was slightly slower in rate of water absorption at liquid to solid ratios of 50:1 and 25:1. It was inferior to Example 1-B in rate of absorption of 1% sodium chloride solution at liquid to solid ratios of 25:1 and 20:1.

EXAMPLE 23

One gram of the material from Example 1-B as it came from the reactor in pellet form and one gram of the same material after being ground through 20 mesh were slurried in 500 ml. portions of distilled water. After standing for 48 hours at room temperature, the gels were collected on tared fluted filter papers. After draining over a weekend in a closed system, the amount of water drained from the ground sample was 248 g. and from the unground sample was 255 g.

The gel from the 20-mesh material was dried in a forced draft oven at 105° C. for 4 hours followed by 18 hours at 100° C. in a convection oven. The weight of product recovered was 0.95 g. indicating only 5% loss from extraction and handling.

The gel from the unground material was washed three times with acetone, then dried 4 hours at 60° C. in vacuo followed by 18 hours at 100° C. in a convection oven. The weight of product recovered was one gram, indicating no loss from extraction and handling.

EXAMPLE 24

Two 1-gram lots of the product of Example 5 (dry basis), ground through 20 mesh, were slurried in 500 ml. of distilled water. After standing 24 hours at room temperature, the slightly viscous supernatant liquid was separated from the insoluble material by careful decantation. The water-insoluble material was slurried in 500 ml. of acetone and left standing at room temperture over a weekend. The difficultly filterable supernatant liquid was filtered through tared fluted filter papers in a closed system over a period of seven days. The amount of liquid drained through the filters in this time was 440 ml. in one case and 445 ml. in the other. The filter papers were dried 18 hours at 100° C. in a convection oven and found to have lost 0.06 g. in weight in each case, indicating that substantially no water-insoluble material was present in the supernatant liquid passed through the filter papers.

Excess acetone was removed from the above acetone slurries of the water-insoluble material and the solids washed twice more with acetone to remove water. After removal of excess acetone, the solids were dried in vacuo at 60° C. followed by 18 hours at 100° C. in a convection oven. The weight of recovered water-insoluble material was 0.38 g. in each case, indicating a 62% loss from extraction and handling.

What I claim and desire to protect by Letters Patent is:

1. A method of preparing a modified polysaccharide which exhibits high absorbency for water and salt solutions, which method comprises reacting a water-insoluble, water-swellable polysaccharide simultaneously with acrylamide, at least one other water-soluble monoolefinic vinyl monomer which, in the absence of the polysaccharide, is copolymerizable with acrylamide to form a water-soluble copolymer, and a water-soluble copolymer, and a water-soluble free radical polymerizable divinyl monomer, in the presence of a free radical catalyst system, said reaction being carried out in a reaction medium comprising a substantially water-immiscible inert aromatic hydrocarbon having dispersed therein water equal to about 1.5 to 2.5 times the weight of the aforesaid reactants and a low boiling, water-miscible, organic liquid selected from the class consisting of acetone and isopropyl alcohol, in an amount equal to about 25 to 65% of the volume of the aromatic hydrocarbon.

2. The method according to claim 1 wherein the polysaccharide material is selected from the class consisting of cellulose, oxidized cellulose, starch and guar gum.

3. The method according to claim 1 wherein the water-immiscible inert liquid is toluene and the low boiling, water-miscible organic liquid is actone.

4. The method according to claim 3 wherein the polysaccharide material is selectd from the class consisting of cellulose, oxidized cellulose, starch, and guar gum.

5. The method according to claim 4 wherein the other vinyl monomer is sodium acrylate and the divinyl monomer is methylene-bis-acrylamide.

6. The method according to claim 5 wherein the acrylamide component of the vinyl monomers is about 20 to 30% by weight thereof.

7. The method according to claim 3 wherein the amount of acetone is between about 30 and 55% bsed on the volume of toluene.

8. A method of preparing a water-insoluble cellulose derivative having high absorbency for water and salt solutions which comprises reacting cellulose or oxidized cellulose simultaneously with acrylamide, sodium acrylate and methylene-bis-acrylamide in the presence of a free radical catalyst system, said reaction being carried out in a reaction medium comprised of toluene, water equal to 1.5 to 2.5 times the combined weight of the reactants, and acetone in an amount equal to about 30 to 55% of the volume of the toluene.

* * * * *